United States Patent [19]
Connors

[11] 3,885,753
[45] May 27, 1975

[54] SEAT BELT RETRACTOR MECHANISM
[75] Inventor: David G. Connors, Plymouth, Mich.
[73] Assignee: Ford Motor Company, Dearborn, Mich.
[22] Filed: Mar. 14, 1974
[21] Appl. No.: 451,314

[52] U.S. Cl. .......................................... 242/107.4
[51] Int. Cl. ........................................... B65b 75/48
[58] Field of Search ......... 242/107.4; 297/385, 388; 280/150 SB

[56] References Cited
UNITED STATES PATENTS
| | | | |
|---|---|---|---|
| 3,495,786 | 2/1970 | Hemens | 242/107.4 |
| 3,578,260 | 5/1971 | Kell | 242/107.4 |
| 3,834,646 | 9/1974 | Heath | 242/107.4 |

Primary Examiner—Edward J. McCarthy
Attorney, Agent, or Firm—John J. Roethel; Keith L. Zerschling

[57] ABSTRACT

A seat belt retractor mechanism having a belt receiving reel adapted to be held against rotation in belt protraction direction by a locking bar. The locking bar is driven into locking position by an inertia sensor comprising a pendulum.

The improvement comprises an elongated drive link having at one end a first portion abutting the pendulum and a second portion having an interlocking lost motion connection with the locking bar. The drive link at its other end has a pawl appendage. The pendulum when accelerated causes the drive link to be moved an initial distance to place the pawl appendage into abutting relation to an annular ratchet plate secured to the reel, the locking bar being nonresponsive to movement of the drive link during its initial movement because of the lost motion connection therebetween. Rotation of the reel caused by protraction forces exerted on the belt subsequent to pendulum displacement causes the drive link to be moved, through engagement of its pawl appendage with the annular ratchet plate, beyond its initial movement to drive the locking bar into a reel locking position preventing further belt protraction.

8 Claims, 4 Drawing Figures

SEAT BELT RETRACTOR MECHANISM

BACKGROUND OF THE INVENTION

Vehicle seat back retractor mechanisms are known in which the reel is freely movable in belt protraction and retraction directions so that the belt places no restraint on the user under normal vehicle operating conditions. Such an arrangement is particularly desirable for a reel to which a shoulder harness segment of a three-point restraint system used by a vehicle operator is coupled, since the operator must be free to reach various control knobs located on the instrument panel.

In one class of retractor mechanisms, an inertia reel mechanism is utilized which is vehicle sensitive. That is, rapid acceleration or deceleration of the vehicle is sensed by an inertia device, such as a pendulum. Movement of the inertia device results in a locking bar or pawl being driven into engagement with the reel to prevent protraction of the belt. In a device in which the locking bar or pawl is driven directly by the pendulum device, it sometimes fails to engage the reel because of bar or pawl bounce or skip across the top of the ratchet or cam teeth on the reel.

U.S. Pat. No. 3,578,260 issued May 11, 1971 to John Kell for "Inertia Reel Mechanisms" recognizes the problem and offers a mechanism for preventing such locking bar or pawl bounce or skip.

It is an object of the present invention to provide a further improvement in a pendulum actuated link-to-gear interface capable of assuring proper sequential actuation of retractor lock-up with few parts.

SUMMARY OF THE INVENTION

This invention relates to a seat belt retractor mechanism having a belt receiving reel rotatably mounted on a shaft journalled in the side wall of a support bracket. The reel has circular ratchet plates at each reel end, the ratchet plates having peripheral ratchet teeth. A locking bar parallels the reel shaft and is pivotally mounted in the bracket side walls for movement into engagement with the circular ratchet plate to lock the reel against rotation in seat belt protracted direction. The mechanism incorporates an inertia sensor comprising a pendulum for driving the locking bar into circular ratchet plate engagement.

The improvement in the mechanism comprises a substantially vertical, elongated, drive link in suspended, parallel, relationship to one side wall of the support bracket. The drive link at one end has a first portion abutting the pendulum and a second portion having an interlocking connection with the locking bar. The drive link at its other end has a pawl appendage. An annular ratchet plate having internal ratchet teeth is secured to a circular ratchet plate for rotation with the latter and thereby the reel. The pendulum when accelerated causes the drive link to be moved an initial distance to place its pawl appendage into ratchet engagement with the annular ratchet plate. The interlocking connection between the drive link and the locking bar has a lost motion segment wherein the locking bar is nonresponsive to initial movement of the driving link. Rotation of the reel caused by protraction forces exerted on the belt subsequent to pendulum displacement causes the drive link to drive the locking bar into engagement with the circular ratchet plate to lock the reel against further movement in belt protraction direction.

DESCRIPTION OF THE DRAWING

Further features and advantages of the present invention will be made more apparent as this description proceeds, reference being had to the accompanying drawing, wherein.

DETAILED DESCRIPTION OF THE INVENTION

Figures 1, 2:
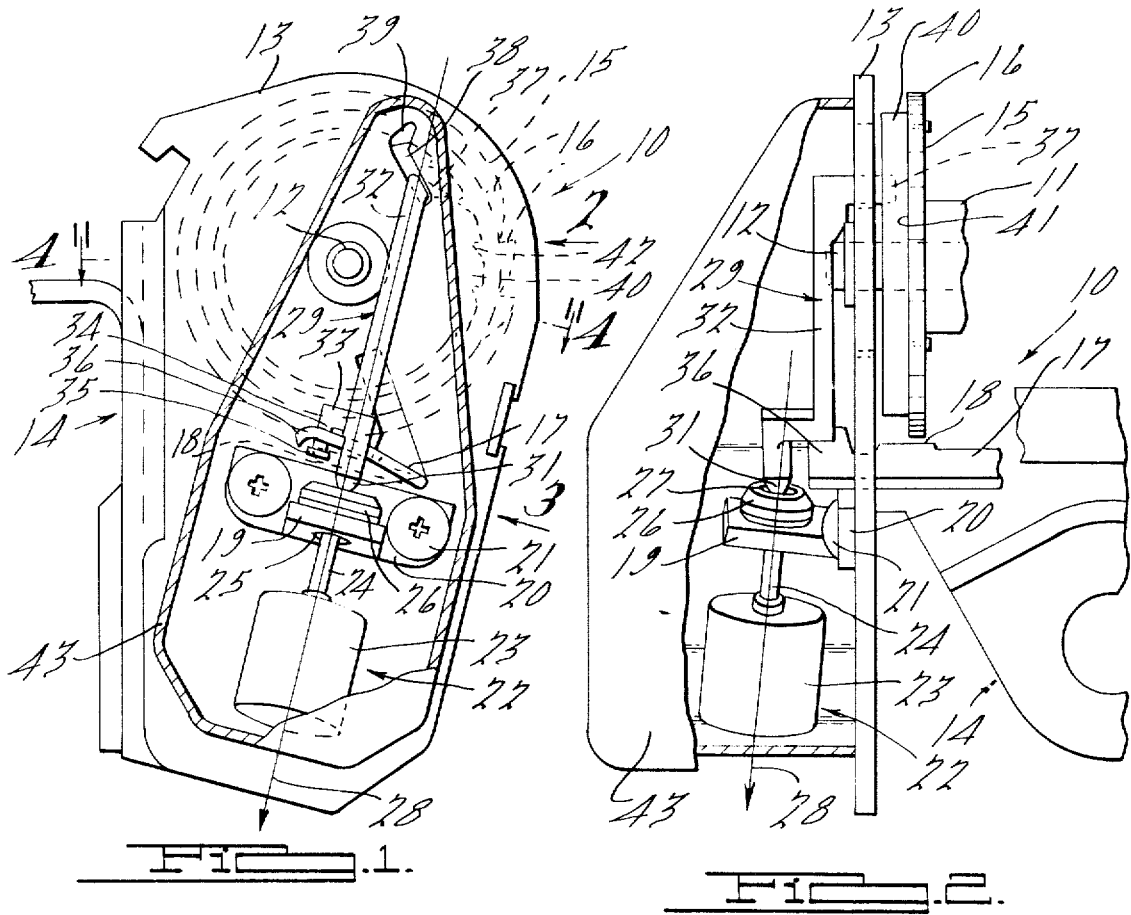
FIG. 1 is a side elevation of an inertial retractor mechanism embodying the present invention.
FIG. 2 is a view in the direction of the arrow 2 in FIG. 1.
Figures 3, 4:
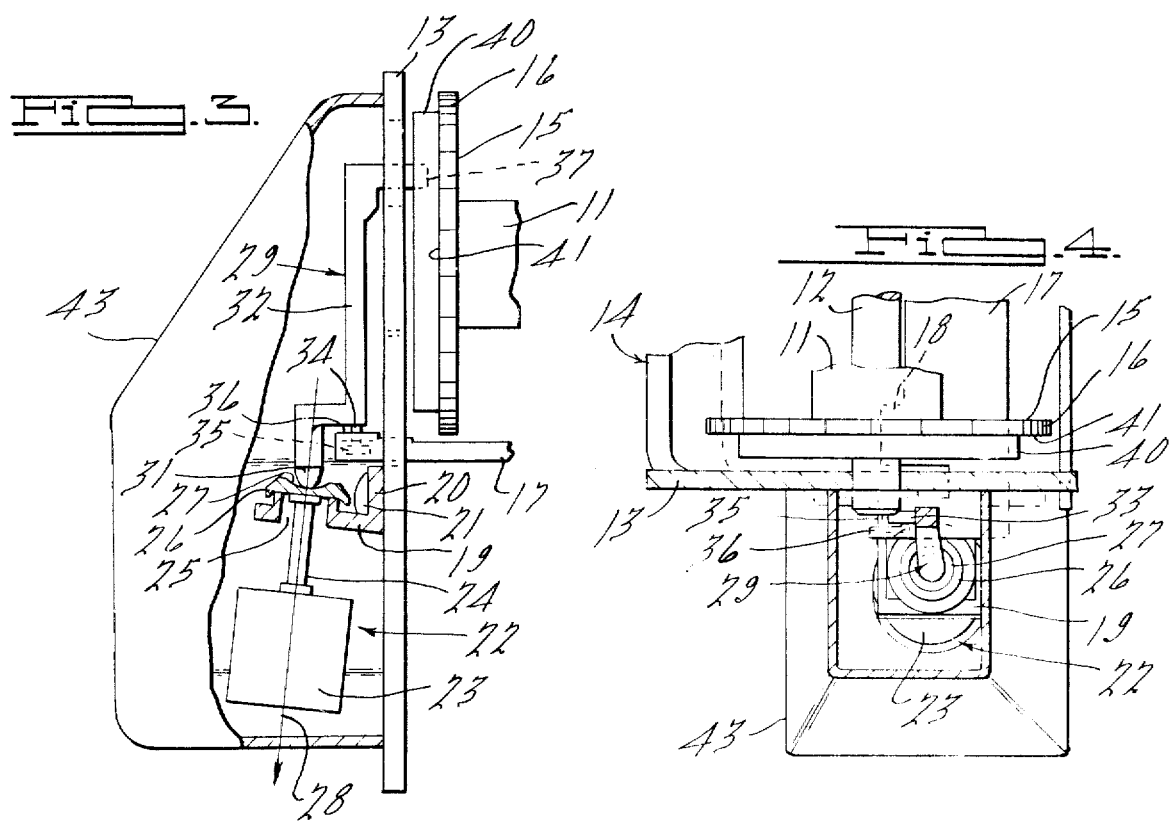
FIG. 3 is a view in the direction of the arrow 3 in FIG. 1.
FIG. 4 is a section view taken on the line 4-4 of FIG. 1.

Referring now to the drawing there is shown one end of a seat belt retractor mechanism, generally designated 10. The retractor mechanism comprises a belt receiving reel 11 rotatably mounted on a shaft 12 journalled in a side wall 13 of a support bracket 14. It will be understood that the reel 11 and its mounting shaft 12 extend to a second side wall, not visible. The reel 11 is coupled at the second wall to a rewind spring (not shown) in a conventional manner.

At each of its ends within the bracket side walls, the reel 11 carries a ratchet plate 15 having peripheral ratchet teeth 16. An elongated bar 17 parallels the reel 11 and its shaft 12, the bar being pivotally mounted within the bracket 14 and having a locking or pawl portion 18 projecting in a general direction of the ratchet teeth 16.

On the outboard side of the bracket side wall 13 is a support plate 19 extending outwardly from a base plate 20 bolted to the bracket side wall 13 by bolts 21. Suspended from the support plate 19 is a pendulum 22. The pendulum 22 comprises a cylindrical weight 23 hanging from a rod 24 projecting through an aperture in the support plate 19. The rod 24 is coupled at its upper end to a circular cap or disc member 26 which rests upon the upper surface of the support plate 19. The circular cap or disc member 26 has a concave pocket 27 in its upper surface.

Perhaps it should be explained at this time that although the pendulum appears in the several views of the drawing to be hanging at an angle, in reality it hangs in a true vertical direction when the retractor mechanism 10 is mounted on a vehicle body structure. That is, the line 28 having the arrow at its lower end is perpendicular to the ground plane on which the vehicle sits. In installed position the bracket 14 is mounted, for example, on an inclined roof rail surface and the retractor pendulum ends up in its true vertical position.

The improved structure in a vehicle sensitive inertiatype retractor mechanism embodying the present invention comprises a substantially vertical, elongated, drive link, generally designated 29, which is suspended from and parallels the exterior side of the side wall 13 of the support bracket. The drive link 29 at its lower end has a rounded end portion 31 outwardly laterally offset from the main body portion 32 of the drive link. The end portion 31 is centered in the concave pocket 27 in the pendulum cap 26.

The main body portion 32 of the drive link 29 at its lower end has a laterally offset arm 33 substantially paralleling the side wall 13. The arm 29 has a depending right angle stem 34 terminating in a cap 35. The locking or pawl bar 17 has a bifurcated extension 36 outboard of the side wall 13. The stem 34 of the drive link 29 lies within the bifurcated end of the extension 36 with the cap 35 underlying the extension 36.

At its upper end the drive link 29 has a right angle extension 37 that is slidably journalled in and passes through a slot 38 in the side wall 13. The main portion of the slot 38 is at an upwardly inclined angle to the drive link 29. The slot at its upper end terminates in a short radially extending portion 39, the terminal portion lying on a radial line passing through the center of the reel shaft 12. The right angle extension 37 of the upper end of the drive link 29 functions as a pawl adapted to engage the ratchet teeth on an annulus 40. The annulus 40 comprises a ring secured to the face of the ratchet plate 15 adjacent the inner surface of the side wall 13, sufficient space having been provided for the annulus 40 to be positioned between the ratchet plate 15 and the side wall 13. The annulus 40 has a plurality of internal ratchet teeth 42 equal in number to the ratchet teeth 16 on the periphery of the ratchet plate 15. The pawl 37 engaging faces of the ratchet teeth 42 on the annulus 40 are in advanced relation to the pawl 18 engaging faces of the ratchet teeth 16 on the ratchet plate 15, for a reason to become apparent.

The pendulum device 22 and the drive link 29 located on the exterior of the side wall 13 are covered by a suitable cover 43.

When the vehicle in which the retractor mechanism embodying the present invention is mounted is suddenly stopped, as by a hard application of the brakes or upon impact with a barrier or another vehicle, the pendulum 22 senses the vehicle deceleration in that it is accelerated from an at rest position relative to the vehicle. As the pendulum 22 tilts relative to the support plate 19, it causes the drive link 29 to be vertically raised to position the drive link pawl portion 37 into the path of an annulus ratchet tooth 42. During this initial upward movement of the drive link 29, no movement is imparted to the locking bar 16. As best seen in FIG. 1, the stem 34 of the drive link carrying the cap 35 is of sufficient length to provide for lost motion movement of the cap 35 upwardly. During this initial movement, the cap 35 is moved immediately under the locking bar extension 36 but does not impart any tilting movement to the locking bar.

If the deceleration forces on the vehicle are great enough, the seat belt restrained seat occupant will move forwardly relative to the vehicle seat causing the shoulder harness belt segment coupled to the reel 11 to rotate the reel slightly in belt protraction direction. This would be in a counterclockwise direction as viewed in FIG. 1. Since the drive link pawl portion 37 is in the path of an annulus ratchet tooth 42, rotation of the reel 11 in the counterclockwise direction results in a ratchet tooth 42 abutting the pawl 37 and driving the pawl end of the link 29 upwardly in the slot 38 toward the radially extending slot portion 39. As this occurs, the lower end, i.e., cap 35, of the drive link 29 pivots the locking bar 17 so that its pawl 18 engages a ratchet tooth 16 on the reel ratchet plate 15. This immediately causes the reel to be locked against further belt protraction rotation.

Since the annulus ratchet teeth 42 are advanced relatively to the ratchet plate teeth 16, the upward movement of the drive link 29 caused by engagement of its pawl 37 by a ratchet tooth 42 results in the locking bar 17 being driven upwardly with its pawl 18 slightly ahead of the pawl engageable face of the ratchet tooth 16 positioned to be engaged by the pawl 18. Thus, the pawl 18 cannot skip or bounce off the top of a ratchet tooth 16 attempting to pass under the pawl 18 because of a mistimed engagement attempt.

It is to be understood this invention is not limited to the exact constructions illustrated and described above, but that various changes and modifications may be made without departing from the spirit and scope of the invention as defined by the following claims.

I claim:

1. A seat belt retractor mechanism having a belt receiving reel rotatably mounted on a shaft journalled in side walls of a support bracket, the reel at each of its ends having circular ratchet plates with peripheral ratchet teeth, a locking bar paralleling the reel shaft and pivotally mounted in the bracket side walls for movement into engagement with the circular ratchet plates to lock the reel against rotation in seat belt protraction direction, and an inertia sensor comprising a pendulum for driving the locking bar into circular ratchet plate engagement, wherein the improvement comprises:

a substantially vertical, elongated, drive link paralleling one side wall of the support bracket, the drive link at one end having a first portion abutting the pendulum and a second portion having an interlocking connection with the locking bar, the drive link at its other end having a pawl appendage, an annular ratchet plate having internal ratchet teeth, the annular ratchet plate being secured to a circular ratchet plate for rotation with the latter and thereby the reel, the pendulum when accelerated causing the drive link to be raised an initial distance to place its pawl appendage into ratchet engagement with the annular ratchet plate, the interlocking connection between the drive link and the locking bar having a lost motion segment wherein the locking bar is nonresponsive to initial movement of the driving link, rotation of the reel caused by protraction forces exerted on the belt subsequent to pendulum displacement causing the annular ratchet plate to further raise the drive link to drive the locking bar into engagement with the circular ratchet plate to lock the reel against further movement in belt protraction direction.

2. A seat belt retractor mechanism according to claim 1, in which:

the annular ratchet plate teeth are positioned in a predetermined relationship to the circular ratchet plate teeth, the locking bar being driven into full depth insertion into the circular ratchet plate teeth in timed sequence to engagement of the drive link pawl with the annular ratchet plate teeth.

3. A seat belt retractor mechanism according to claim 2, in which:

the pendulum and drive link are located externally of the one side wall of the bracket, and the drive link pawl appendage projects through a guide slot in the bracket one side wall into operative relationship to the annular ratchet plate.

4. A seat belt retractor mechanism according to claim 3, in which:
the drive link pendulum abutting portion and the locking bar interlocking portion are both at the lower end of the drive link, the interlocking portion being laterally offset from the pendulum abutting portion,
and the drive link pawl appendage is at the upper end thereof.

5. A seat belt retractor mechanism according to claim 4, in which:
the annular ratchet plate is interposed between the slotted side wall of the bracket and the adjacent circular ratchet plate and is secured to the latter.

6. A seat belt retractor mechanism according to claim 1, in which:
the pendulum and drive link are located externally of the one side wall of the bracket,
and the drive link pawl appendage projects through a guide slot in the bracket one side wall into operative relationship to the annular ratchet plate.

7. A seat belt retractor mechanism according to claim 6, in which:
the annular ratchet plate is interposed between the slotted side wall of the bracket and the adjacent circular ratchet plate and is secured to the latter.

8. A seat belt retractor mechanism according to claim 7, in which:
the pendulum abutting portion of the drive link and the interlocking portion of the locking bar are both at the lower end of the drive link, the interlocking portion being laterally offset from the pendulum abutting portion,
and the drive link pawl appendage is at the upper end thereof.

* * * * *